(12) United States Patent
Spetz et al.

(10) Patent No.: US 7,331,590 B2
(45) Date of Patent: Feb. 19, 2008

(54) COMMERCIAL VEHICLE SUSPENSION ASSEMBLY

(75) Inventors: John W. Spetz, Morristown, TN (US); Phillip A. Bishop, Sullivan, TN (US)

(73) Assignee: TRW Automotive U.S. LLC, Livonia, MI (US)

( * ) Notice: Subject to any disclaimer, the term of this patent is extended or adjusted under 35 U.S.C. 154(b) by 416 days.

(21) Appl. No.: 11/000,327

(22) Filed: Nov. 30, 2004

(65) Prior Publication Data

US 2006/0113739 A1 Jun. 1, 2006

(51) Int. Cl.
*B62D 3/12* (2006.01)
(52) U.S. Cl. .................................. 280/93.514
(58) Field of Classification Search ........... 280/93.514, 280/93.515; 180/428
See application file for complete search history.

(56) References Cited

U.S. PATENT DOCUMENTS

| | | | | |
|---|---|---|---|---|
| 2,730,186 A | * | 1/1956 | Morgen | 180/424 |
| 3,927,899 A | * | 12/1975 | Bough | 280/775 |
| 5,597,181 A | * | 1/1997 | Lyles et al. | 280/93.507 |
| 5,851,015 A | | 12/1998 | Klosterhaus | |
| 6,325,396 B1 | * | 12/2001 | Romig | 280/98 |
| 6,402,170 B1 | * | 6/2002 | Hurlburt | 280/103 |
| 6,637,540 B2 | * | 10/2003 | Kielar et al. | 180/402 |
| 6,641,156 B1 | | 11/2003 | Barlas et al. | |
| 2005/0173883 A1 | * | 8/2005 | Mayenburg et al. | 280/124.116 |

* cited by examiner

*Primary Examiner*—Faye M. Fleming
(74) *Attorney, Agent, or Firm*—MacMillan, Sobanski & Todd, LLC

(57) ABSTRACT

This invention relates to a commercial vehicle suspension assembly that includes an axle, a rack and pinion steering assembly, and a pivot mount assembly for connecting the rack and pinion steering assembly to the axle of the vehicle. The pivot mount assembly controls a pivoting motion of the axle relative to the rack and pinion steering assembly. The pivot mount assembly comprises a clamp portion and a mounting portion. The clamp portion is configured to support the rack of the rack and pinion steering assembly. The mounting portion is configured to attach the rack and pinion steering assembly to the axle.

17 Claims, 6 Drawing Sheets

COMMERCIAL VEHICLE SUSPENSION ASSEMBLY

BACKGROUND OF THE INVENTION

This invention relates in general to a vehicle suspension assembly and in particular to a front axle and steering gear assembly preferably for use in a commercial vehicle suspension assembly.

A commercial vehicle, as described herein, is typically a heavy vehicle such as a truck or bus, as well as similar freight and utility vehicles. Such vehicles are typically known as Class 2 (or higher) vehicles and such classification is based on Gross Vehicle Weight (GVW). Vehicles can be rigid (e.g. a truck) or combination (e.g. a truck and trailer). The GVW of a vehicle is the gross laden weight (GLW) or gross combined weight (GCW) if it's a combination vehicle. The Gross Vehicle Weight (GVW) means the weight of a fixed or combination vehicle, together with any load it is carrying (including equipment and accessories). Such vehicles typically, according to conventional technology, incorporate a longitudinal chassis element in the form of two side frame members which are connected to one another by a number of cross-members. The side frame members extend substantially parallel with one another along substantially the whole length of the vehicle and support vehicle components such as the engine, the driver's cab and a load surface which takes the form of, for example, a load platform or a superstructure. In addition, the vehicle's front and rear axles are suspended from the frame side members.

In heavy vehicles, the side frame members and the cross-members act as the main load bearing elements of the vehicle in order to provide strength and rigidity thereto. In heavy vehicles, the body work also contributes to vehicle rigidity and strength. Conventionally designed support devices are nevertheless built so as to allow slight bending and torsion in order to be able to cope with heavy loads and varying road conditions. Relatively low resistance to bending and torsion does entail, however, certain problems with regard to riding comfort and vehicle running characteristics. The use of a chassis element having relatively low resistance to torsion (and the wheel axles being made of steel) can result in unsatisfactory riding comfort. Riding comfort is an increasingly important factor due to the number of heavy vehicles that are travelling on smooth roads as well as in off-road conditions. In addition to riding comfort being important for the vehicle's driver and passengers, it is also important to reduce the amount of damage to freight, particularly when carrying goods which are easily damaged. Conventional frame side members and steel wheel axles result in any road surface unevenness being propagated in the support device and having adverse effects on substantially the whole vehicle.

The conventional structure of a heavy vehicle also has the disadvantage that its manufacture is relatively expensive because such a design involves many different components which cannot be standardized for different vehicle variants. For example, the vehicle's front and rear axle arrangements may involve many different components depending on whether the respective wheels are to be steerable or not, powered or not, how many rear axles the vehicle is to have, the type of suspension, etc. Such a conventionally constructed heavy vehicle also requires a relatively large amount of assembly work.

To operate the steering of such a heavy vehicle, the vehicles typically include a re-circulating ball steering assembly. Re-circulating ball steering assemblies typically includes linkages that turn the vehicle wheels in a manner that is different than with a rack and pinion system. Most re-circulating ball steering gears include a worm gear. The worm gear comprises two parts, a block with a threaded opening with gear teeth on an outer surface thereof that engages a gear that moves a pitman arm. The steering wheel connects to a threaded rod, similar to a bolt, that fits into the threaded opening of the block. When the steering wheel turns, it turns the bolt. The bolt is held fixed so that when it spins, it moves the block, which in turn moves the gear that turns the wheels. Instead of the bolt directly engaging the threads of the block, all of the threads are filled with ball bearings that re-circulate through the gear as it turns. The balls, therefore serve two purposes. First, they reduce friction and wear in the gear, and second, they reduce chucking motion or play within the gear. The play or chucking would be felt when the steering wheel direction is changed. Without the use of the balls, the teeth would come out of contact with each other for a moment, thereby making the steering wheel feel loose.

SUMMARY OF THE INVENTION

This invention relates to a commercial vehicle suspension assembly that includes an axle, a rack and pinion steering assembly, and a pivot mount assembly for connecting the rack and pinion steering assembly to the axle of the vehicle. The pivot mount assembly controls a pivoting motion of the axle relative to the rack and pinion steering assembly. The pivot mount assembly comprises a clamp portion and a mounting portion. The clamp portion is configured to support the rack of the rack and pinion steering assembly. The mounting portion is configured to attach the rack and pinion steering assembly to the axle.

This invention also relates to a commercial vehicle suspension assembly that includes an axle, a rack and pinion steering assembly, and a pivot mount assembly for connecting the rack and pinion steering assembly to the axle of the vehicle. The pivot mount assembly controls a pivoting motion of the axle relative to the rack and pinion steering assembly. The pivot mount assembly comprises a clamp portion, a mounting portion and a fastener that connects the clamp portion to the mounting portion.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
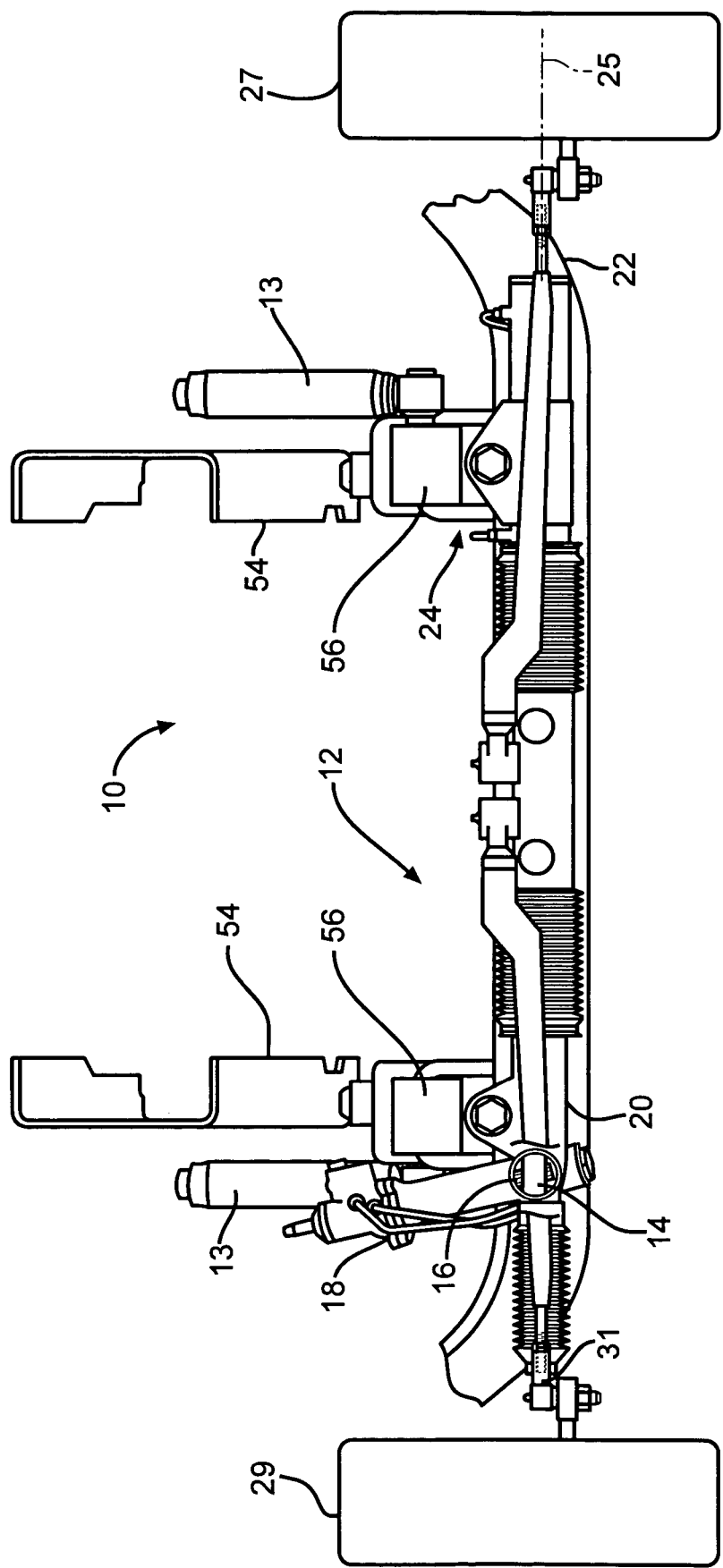
FIG. 1 is a front elevation view of a vehicle rack and pinion steering assembly and an axle assembly for a commercial vehicle having a pivot mount assembly according to the present invention for connecting the components together.

Referring now to the drawings, there is illustrated in FIG. 1 an axle assembly, indicated generally at 10, for a commercial vehicle and a rack and pinion steering assembly, indicated generally at 12, according to the present invention. Also shown are a set of suspension springs 13 and a portion of vehicle frame members 54. The rack and pinion steering assembly 12 is generally conventional in operation in that a typical rack and pinion power steering apparatus for use in a power-assisted vehicle steering system includes a rack 14 operatively coupled with steerable vehicle wheels 27 and 29, and a pinion 16 operatively coupled with a vehicle steering wheel (not shown). Teeth at one end of the pinion 16 are meshed with teeth on the rack 14 such that rotation of the pinion 16 produces linear movement of the rack 14, which, in turn, causes the steerable wheels to turn laterally with respect to the vehicle. The pinion 16 is connected at another end with the vehicle steering wheel by an input shaft (not shown) and a torsion bar (not shown). It should be appreciated that for use with a heavy vehicle such as a truck or bus, the size (e.g. diameter) of the rack and pinion steering assembly 12 will be larger than that of a rack and pinion steering assembly for a smaller vehicle (such as a passenger vehicle or a light or medium duty truck). Additionally, although a portion of the rack housing 20 is cut away to show the rack 14 and pinion 16 in FIG. 1, it should be appreciated that there would not be an opening in the assembled axle assembly 10.

The rack and pinion steering assembly 12 according to the present invention can be a power-assisted rack and pinion steering assembly including a hydraulic valve portion 18 that uses hydraulic power to assist the steering operation of the vehicle. A valve assembly (not shown) is provided within the valve portion 18 and includes the input shaft, the torsion bar, a valve sleeve (not shown) and the pinion 16. When the rack and pinion steering assembly is mounted in a vehicle, the input shaft is connected to a steering wheel. Rotation of the steering wheel results in rotation of the input shaft. The input shaft is fixed relative to the end of the torsion bar so that rotation of the input shaft results in rotation of the end of the torsion bar. Torsion of the torsion bar causes a valve core to move relative to a valve sleeve. The operation of any rack and pinion steering assembly (appropriately configured to operate with a heavy vehicle) is generally known in the art and therefore will not be described in greater detail than necessary to understand the invention herein. The rack and pinion steering assembly shown and described in U.S. Pat. No. 6,684,727 to Krause is one such rack and pinion steering assembly, the disclosure of which is incorporated by reference in entirety herein.

During movement of the rack 14 relative to a rack housing 20, interaction of teeth of the rack 14 with teeth of the gear portion of the pinion 16 rotates the pinion 16. Rotation of the pinion 16 rotates the valve sleeve relative to the valve core. As a result, movement of the rack 14 rotates the valve assembly 18 back into the neutral position. When the valve assembly 18 is in the neutral position, fluid is again directed from the valve sleeve passages to be returned to a reservoir.

Rack and pinion types of steering units would be desirable for a large vehicle application because they are lighter in weight, less costly, and can provide more steering precision and better steering feel than re-circulating ball types of steering units, such as are typically used on large vehicle applications, such as heavy vehicles (trucks). However, it can be appreciated that either type of steering system can be used with the present invention.

Figure 2:
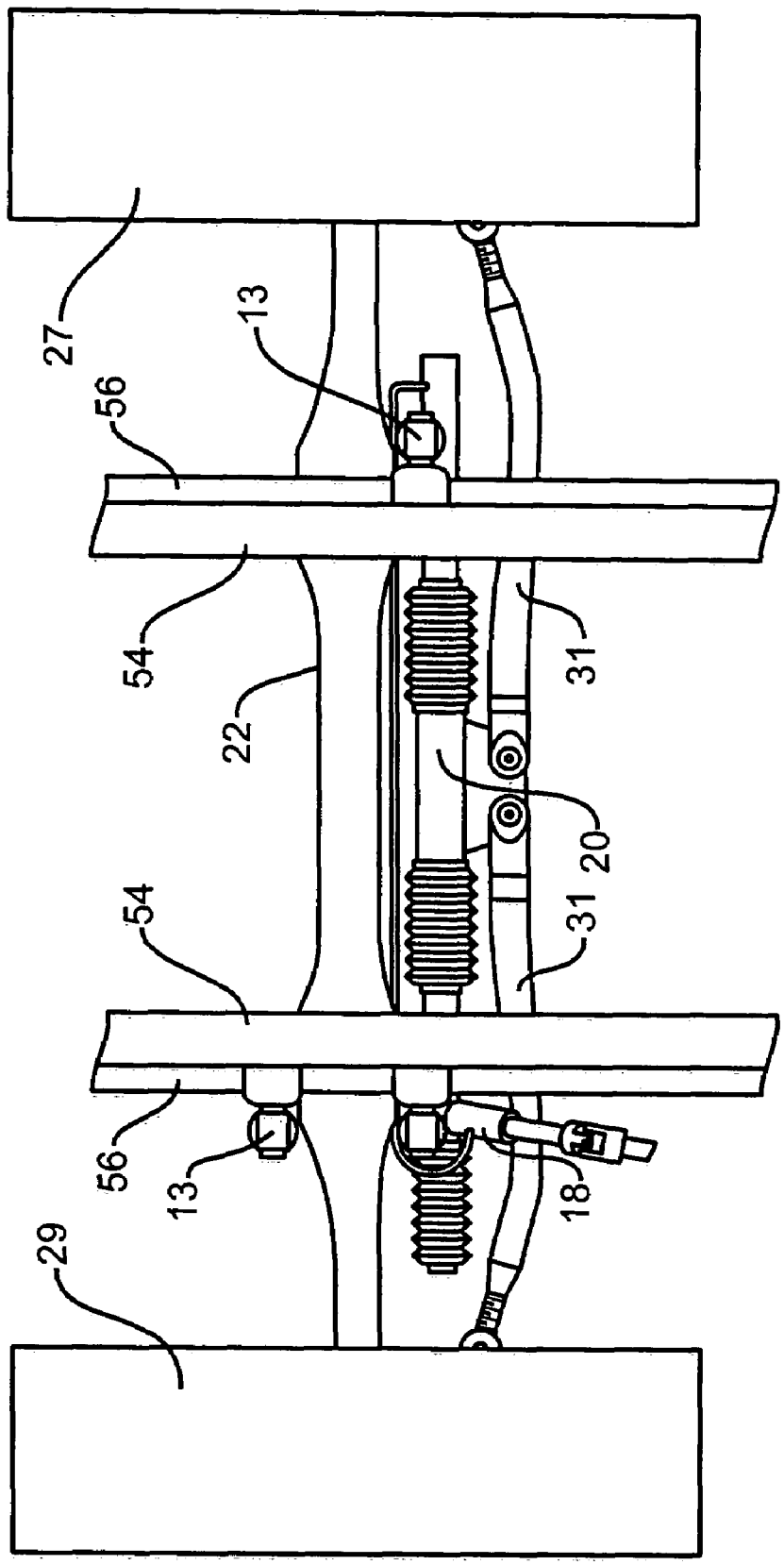
FIG. 2 is a plan view of the vehicle rack and pinion steering assembly and axle assembly shown in FIG. 1.
Figure 3:
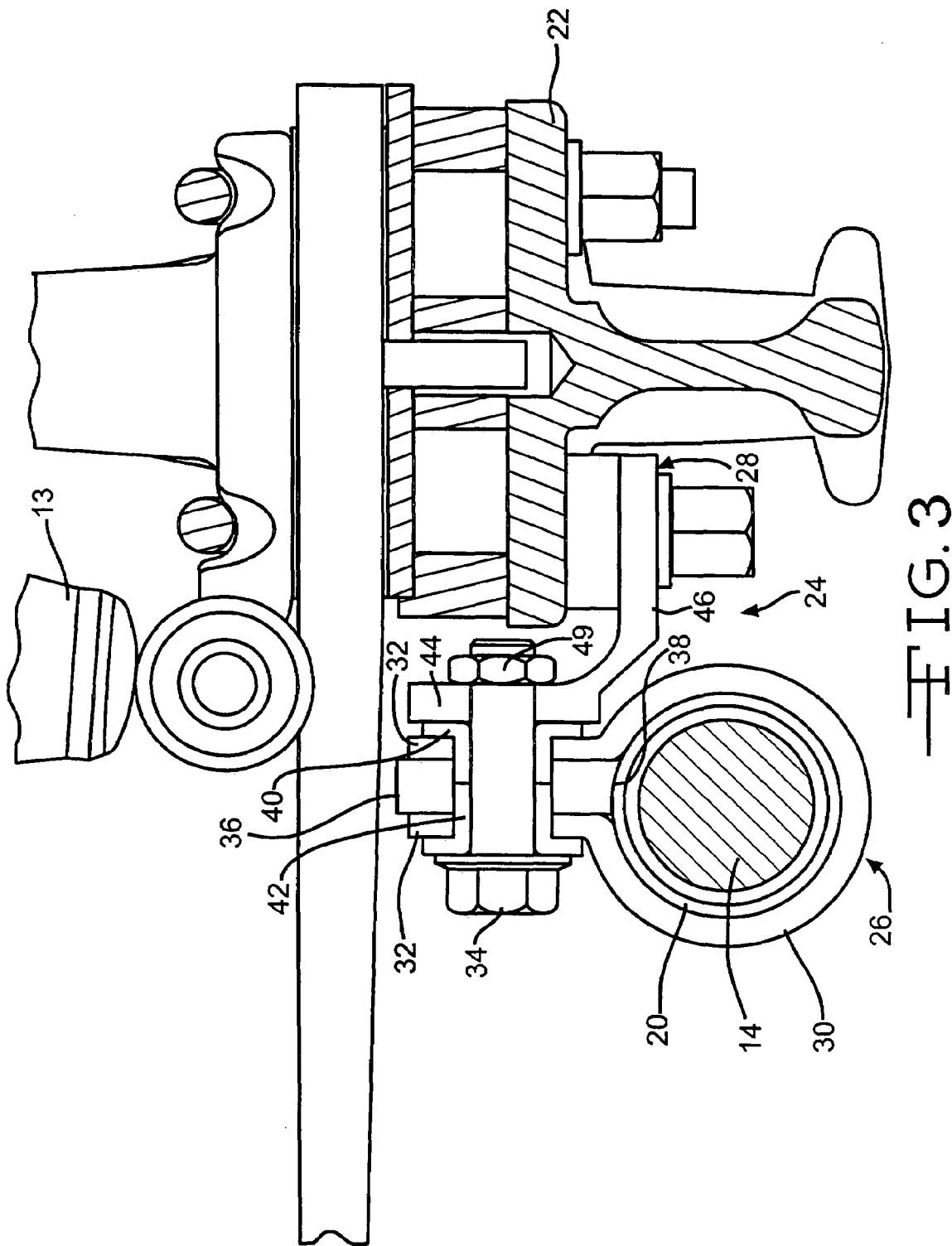
FIG. 3 is an end elevation view of the vehicle rack and pinion steering assembly and an axle assembly of FIG. 1, showing the pivot mount assembly according to the present invention.

As shown in FIG. 1, the vehicle axle assembly 10 is a front axle assembly and includes a laterally extending front axle or frame member 22 that extends along a drive axis 25 between the left front wheel 27 and right front wheel 29 of the vehicle. A drive shaft (not shown) extends rearward from a differential gear housing (not shown) to the vehicle power source (not shown). The differential transmits rotational force from the drive shaft to the front wheels to drive the front wheels to effect forward and rearward movement of the vehicle along the ground. It can be appreciated that the vehicle also includes a rear axle having a laterally extending frame member that extends along a drive axis between the left rear and right rear wheels of the vehicle. In the preferred embodiment, tie rods, schematically shown at 31 in FIG. 1, connect the vehicle wheels 27 and 29 to the rack and pinion steering assembly 12 utilize a "center take-off" design. For the purposes of clarity, the tie rods 31 and the vehicle axle assembly 10 are shown in a plan view in FIG. 2 in order to allow the relative positions of the rack 14, front axle 22, wheels 27 and 29, and tie rods 31 to be seen. It can be appreciated that according to the present invention, the vehicle can implement an "end take-off" design if so desired. Both center take-off and end take-off are terms that are understood by those skilled in the art and therefore will not be described further herein.

As shown in FIG. 1, the rack and pinion steering gear assembly 12 is attached to the front axle 22 using a pivot mount assembly, indicated generally at 24. The pivot mount assembly 24 comprises a clamp portion 26 and a mounting portion 28. As shown in FIGS. 2-5, the clamp portion 26 includes a tube portion 30 and a pair of arms 32 extending therefrom. The tube portion 30 is configured to support the tubular rack housing 20 and is preferably sized to wrap around a portion of the outer surface of the rack housing 20. The arms 32 extend from the ends of the tube portion 30. The structure and operation of the pivot mount assembly 24 will be described in greater detail below. The pivot mount assembly 24 is preferably made from a cast steel material. However, it can be appreciated that the assembly 24 can be made from aluminum or any other metal and non-metal material if so desired.

Figure 4:
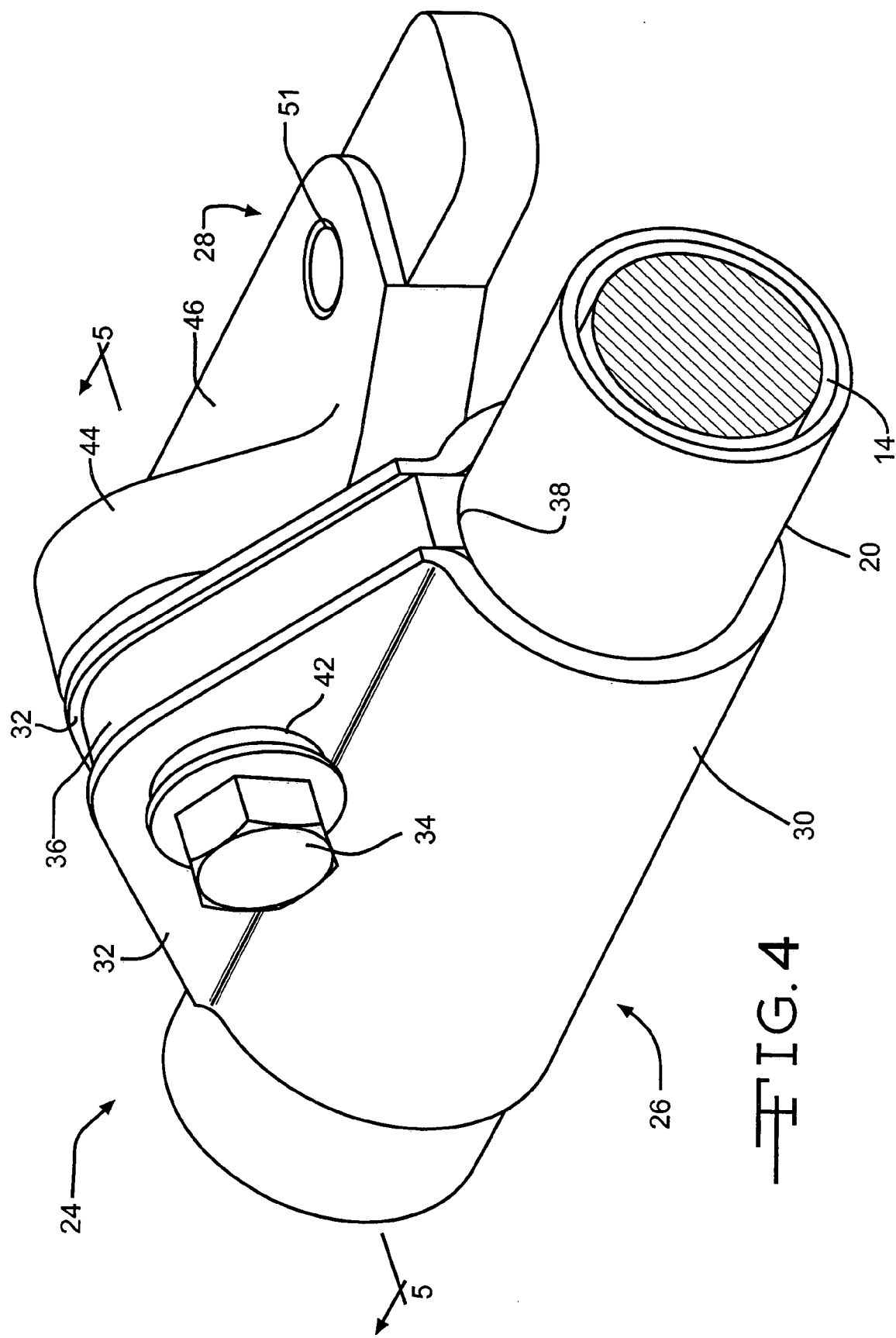
FIG. 4 is an enlarged perspective view of the pivot mount assembly according to the present invention.
Figure 5:
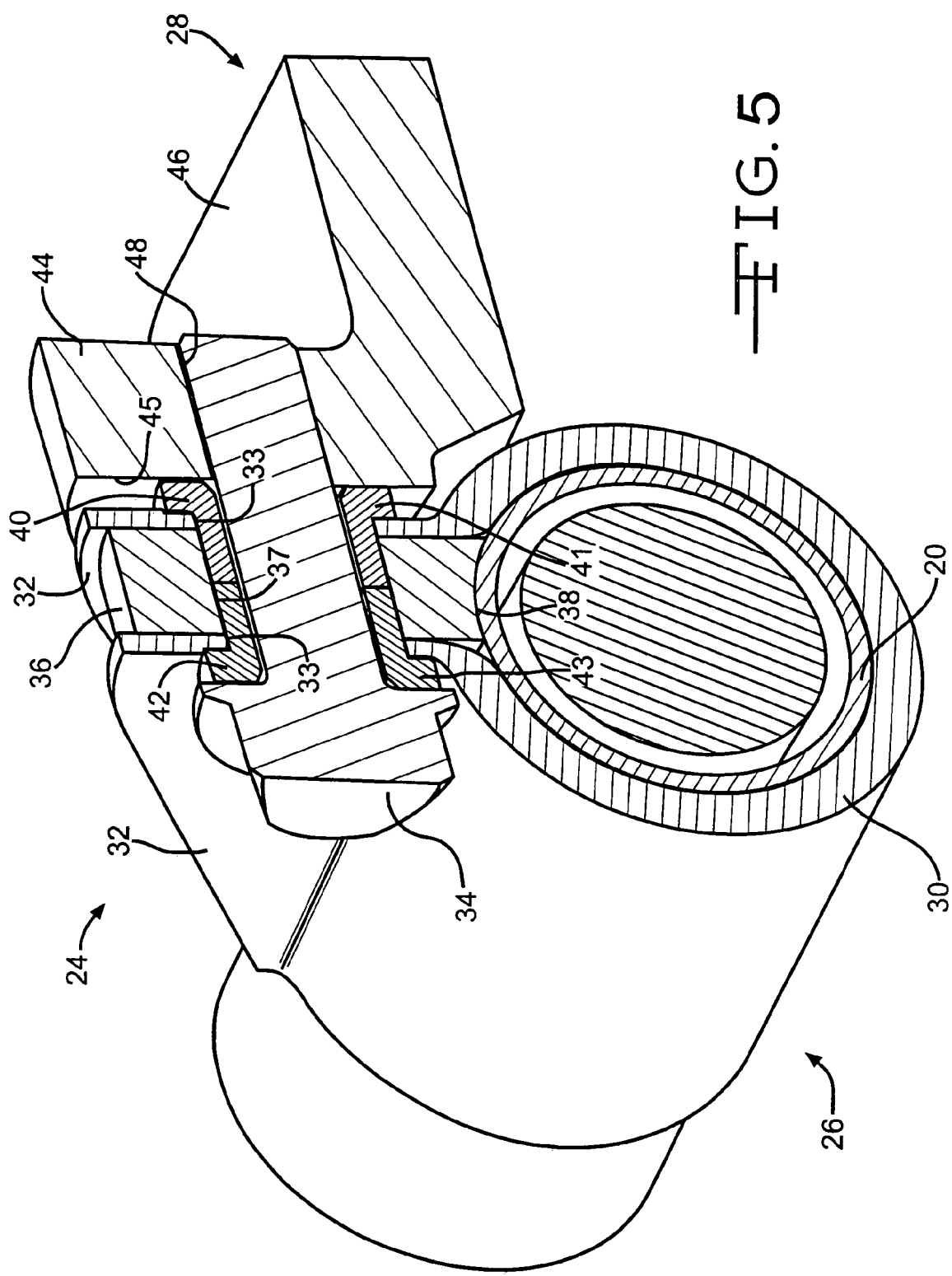
FIG. 5 is an enlarged sectional view of the pivot mount assembly of FIG. 4 taken along Line 5-5.

The pivot mount assembly 24 of FIG. 1 can be more clearly seen in FIGS. 2-5. With respect to the portion of the rack and rack housing 20 shown in FIGS. 2-5, it should be appreciated that there can be other components positioned within the rack housing 20 in accordance with rack and pinion steering assembly designs as are known in the art. Only the rack 14 and the rack housing 20 are illustrated herein for the purposes of clarity. As shown in FIG. 5, each arm 32 includes a bore 33 formed therethrough such that a fastener 34 can be received therein. Since the tube 30 is preferably a partial tube, the arms 30 are spaced apart a distance depending on the size of the tube 30. It should be appreciated that the tube 30 can be a complete tube or a partial tube (as shown) and therefore, the arm 32 design will vary according to the tube design. Since the arms 32 are spaced apart, as can be seen clearly in FIGS. 4 and 5, a spacer 36 is positioned between the arms 32 to support the arms 32 from being substantially pressed together due to pressure that might be applied from the fastener 34 or during operation of the vehicle.

The spacer 36 preferably also includes a bore 37 formed therethrough that can receive a portion of the fastener 34 so that the fastener 34 can retain the spacer 36 between the arms 32. The spacer 36 includes a lower portion 38 which is preferably shaped complementarily to the shape of the outer surface of the rack housing 20 so as to abut directly therewith. In the preferred embodiment, the spacer 36 is welded at the interface with the rack housing 20 to provide additional stiffness. Although the spacer 36 is preferably made from a solid steel material because such a material has properties that prevent it from being substantially compressed, it can be appreciated that the spacer 36 can also be made of any other suitable material if so desired.

The pivot mount assembly 24 further includes a pair of bushings, namely a first or inboard flanged bushing 40 and a second or outboard flanged bushing 42, that are positioned between the fastener 34, and the arms 32 and the spacer 36 of the clamp portion 26. Each bushing 40 and 42 include a flanged portion 41 and 43, respectively, that extend away from the bore 33 of the clamp portion 26. The bushings 40 and 42 are positioned within the associated bores 33 and 37 of the arms 32, and the spacer 36, respectively. The bushings 40 and 42 act to provide a surface for which the front axle 22 and the mounting portion 28 can pivot when the front axle 22 is deflected by vehicle loading, as will be described in greater detail below. The bushings 40, 42 are preferably made from a steel material because that material has good compressive strength properties; however, it can be appreciated that the bushings 40, 42 can also be made of an aluminum or other metal and non-metal materials if so desired. Additionally, since the inboard bushing 40 is the bushing against which the axle 22 will pivot, it can be appreciated that the bushing 40 could be replaced with a roller bearing (not shown) or a similar component that facilitates a pivoting motion between the axle 22 and the rack housing 20 (as is shown and described below with respect to FIGS. 6 and 7).

Connected to the clamp portion 26 is the mounting portion 28. The mounting portion 28 includes a flange 44 and a bracket 46. The flange 44 includes a bore 48 that is configured to be positioned coaxially with the bores 33 of the clamp portion 26 so that the fastener 34 can pass through both bores 33 and 48 and secure the two components together. In the preferred embodiment, illustrated in FIG. 5, the bore 48 of the mounting portion 28 can be threaded so that the fastener 34 is in threaded engagement with the mounting portion 28; alternatively, as shown on FIG. 3, the fastener 34 can be sized to pass through a non-threaded bore 48 so that a nut 49 can be used to retain the mounting portion 28 with the clamp portion 26. The structure utilized herein to facilitate the connection between the mounting portion 28 and the clamp portion 26 is the fastener 34. Such a design is referred to as a "spike mount design". The "spike" of the spike mount design is the fastener 34. The spike mount design permits deflection of the axle 22 while allowing the rack housing 20 (and therefore the rack 14) to remain in a substantially horizontal position. This is accomplished because the spike mount design creates a pivot point between the rack housing 20 and the axle 22. Because of the pivot point, the axle 22 can absorb vehicle forces, and deflect, while the rack housing 20 remains a non-load bearing structure in the vehicle axle assembly 10.

Since the inboard bushing 40 includes a flanged portion 41 that extends away from the bore 33 of the clamp portion 26, a portion of an inner face 45 of the flange 44 will abut the flanged portion 41 of the inboard bushing 40. Due to the thickness of the inboard bushing 40, the flange 44 of the mounting portion 28 will be spaced apart from one of the arms 32 of the clamp portion 26. The distance of the spacing will vary depending on the thickness of the inboard bushing 40. The space between the clamp portion 26 and the mounting portion 28 will allow for some articulation between the components as force is applied to the axle 22. The bracket 46 of the mounting portion extends generally perpendicularly to the flange 44. However, the flange 44 and the bracket 46 can be formed so as to be positioned relative to each other in any suitable orientation. The bracket 46 is configured to be connected with a vehicle frame member, such as the axle 22. Therefore, the bracket 46 can include a plurality of bores (only bore 51 is illustrated in FIG. 4) or other attachment mechanisms that can be used to connect the bracket 46 with the axle 22.

Figure 6:
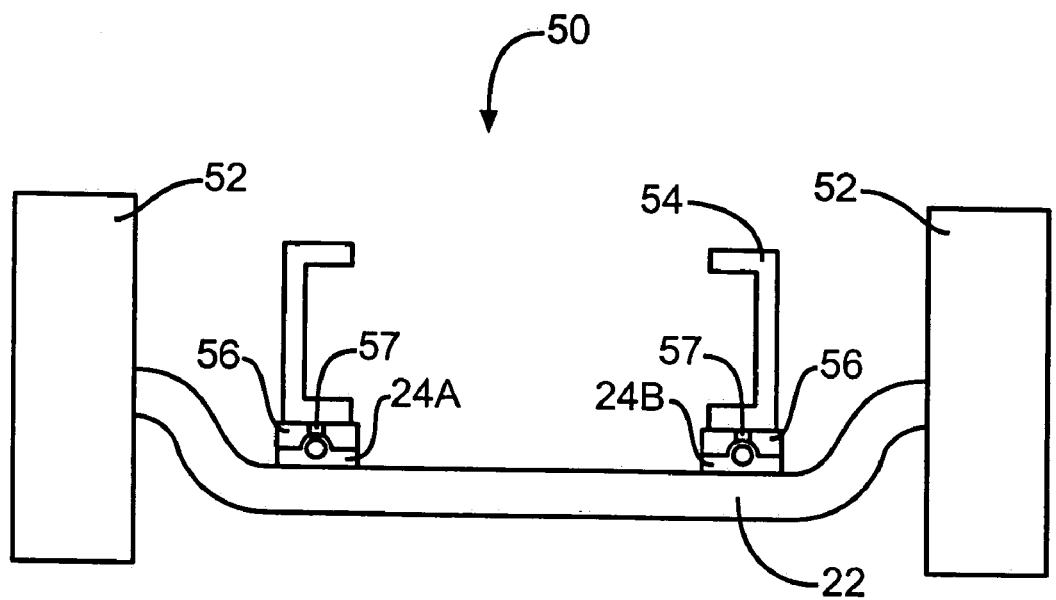
FIG. 6 is an elevation view of a vehicle rack and pinion steering assembly and an axle assembly for a vehicle having a leaf spring connected with the pivot mount assembly according to the present invention.

Two pivot mount assemblies according to the present invention, schematically illustrated in FIG. 6 and indicated generally at 24A and 24B, are used to connect the rack and pinion steering assembly 12 with the axle assembly 10. The pivot mount assemblies 24A and 24B are substantially similar to those shown in FIGS. 1-5. It should be appreciated that the first pivot mount assembly 24A located near the valve portion 18 of the rack and pinion steering assembly 12 is substantially the same as the other pivot mount assembly 24B. However, in the preferred embodiment, the first pivot mount assembly 24A is formed integrally with, or securely joined with, a portion of the rack housing 20 of the rack and pinion steering assembly 12. In view of this, the first pivot mount assembly 24A is preferably made from a cast steel material or the same material as the rack housing 20. The second pivot mount assembly 24B can be made of the same material as well. However, it is preferred that the second pivot mount assembly 24B be made from an aluminum or similar material since there is less of a structural load that the second pivot mount assembly 24B needs to support. Since the second pivot mount assembly 24B is not formed integrally with or securely joined with the other components of the rack and pinion steering assembly, it is preferred that the second pivot mount assembly 24B be welded to the rack housing 20 to secure the components together thereby adding to the stiffness of the overall structure.

Also illustrated in FIG. 6, there is shown a vehicle suspension assembly 50 including wheels 52, a portion of the vehicle frame 54, the axle 22, the first pivot mount assembly 24A, and second pivot mount assembly 24B according to the present invention. As shown, in FIG. 6, and in the preferred embodiment, the vehicle suspension assembly 50 includes a pair of leaf springs 56 to support the weight of a suspended structure, such as the vehicle frame 54. It should be appreciated, however, that the vehicle frame 54 can be supported in any suitable manner. The leaf springs 56 are elongated members that are used as a flexible beam to support the weight of the vehicle frame 54. Each leaf spring 56 of the suspension assembly 50 of the vehicle is configured to be connected to the pivot mount assemblies 24A and 24B. A portion of the mounting structure used to connect each leaf spring 56 to each pivot mount assembly 24 is a support-mount 57 that is engaged to and supports at least a part of the weight of the vehicle frame 54. In the preferred embodiment, the leaf spring 56 support-mount 57 is connected with the axle 22 at the same position as the pivot mount assembly 24 according to the present invention.

In the preferred embodiment, the support-mount 57 of the leaf spring 56 is configured to be connected to the pivot mount assembly 24 that was described above. The portions of each leaf spring 56 that are disposed between each support-mount 57 function as a beam to support the loads applied at the support-mount 57. When the loads at each support-mount 57 change, the magnitude of the bending of the portion of the leaf spring 56 between support-mounts 57 changes in proportion to the change in the load at the support-mount 57. Leaf springs 56 can be used in the suspension system 50 of the vehicle to provide a simple, cost-effective, and easy to design suspension system as compared to suspension systems that include only springs of types other than leaf springs for supporting the weight of the suspended structure.

A suspension system 50 of a vehicle with leaf springs 56, such as according to the present invention, can provide such benefits because many designs of leaf springs 56 are strong enough in all directions, both perpendicular to their longitudinal axis and also along their longitudinal axis, to provide full support of the suspended structure. For example, the suspended vehicle frame 54 can be supported substantially entirely by the leaf springs 56. In other words, in addition to providing full support for the vehicle frame 54 in vertical directions, the leaf springs 56 of the suspension system 50 are capable of providing full support for the vehicle frame 54 in lateral and longitudinal directions. Since the leaf springs 56 are configured to support the loads applied to the wheels 52 and vehicle frame 54, when a load is applied to those components, the rack housing 20 that is supported with the clamp portion 26 of the pivot mount assembly 24 remains in a substantially stable position such that there is little or no deflection or bending of the rack housing 20 and the rack 14.

Figure 7:
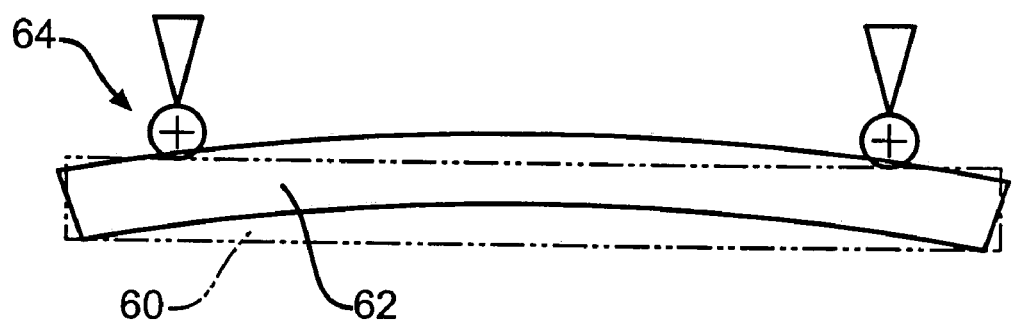
FIG. 7 is an elevation schematic view of a vehicle suspension assembly according to the present invention.

A deflected axle 62 is illustrated in FIG. 7 with a schematic rack housing 60 remaining in a substantially horizontal position. As described above, the pivot mount assembly, indicated generally and shown schematically in FIG. 7 at 64, is configured to allow such a deflection to occur while maintaining the relatively horizontal position of the rack housing 60. As described above with respect to FIGS. 4 and 5, the structure utilized herein to facilitate such relative deflection of the axle 62 while maintaining the rack housing 60 in a substantially horizontal position is the "spike mount design" of the pivot mount assembly 64. The spike (fastener 34) creates a pivot point at each end of the rack housing 60 and the axle 62. Because of the spike mount design, the rack housing 60 is not a support structure in the axle assembly 10 and thus is not required to absorb forces during loading of the vehicle. This thereby prevents the rack housing 60 from binding up or breaking, as well as any other damage to the rack 14 that could affect the handling of the vehicle. It should be appreciated that the suspension system 50 of the vehicle can also include leaf-spring packs (not shown) that include multiple leaf springs 56 stacked upon one another to provide the requisite load carrying ability.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A commercial vehicle suspension assembly comprising:
   an axle;
   a rack and pinion steering assembly; and
   a pivot mount assembly for connecting the rack and pinion steering assembly to the axle of the vehicle such that the pivot mount assembly controls a pivoting motion of the axle relative to the rack and pinion steering assembly;
   wherein the pivot mount assembly comprises a clamp portion and a mounting portion; and
   wherein the clamp portion comprises a tube portion and a pair of arms extending therefrom.

2. The commercial vehicle suspension assembly defined in claim 1 wherein the clamp portion is configured to support a rack of the rack and pinion steering assembly and the mounting portion is configured to attach the rack and pinion steering assembly to the axle.

3. The commercial vehicle suspension assembly defined in claim 1 wherein the pivot mount assembly connects the rack and pinion steering assembly to the axle using a spike mount design.

4. The commercial vehicle suspension assembly defined in claim 3 wherein the spike mount design comprises a fastener that connects the clamp portion to the mounting portion.

5. The commercial vehicle suspension assembly defined in claim 1 further comprising a spacer positioned between the arms for supporting the arms from being compressed together.

6. The commercial vehicle suspension assembly defined in claim 1 further comprising a first bushing positioned between the clamp portion and the mounting portion.

7. The commercial vehicle suspension assembly defined in claim 6 further comprising a second bushing positioned opposite the first bushing and between the clamp portion and a fastener.

8. The commercial vehicle suspension assembly defined in claim 1 wherein two pivot mounting assemblies are used at opposite ends of a rack of the rack and pinion steering assembly to connect the rack and pinion steering assembly to the axle of the vehicle suspension assembly.

9. A commercial vehicle suspension assembly comprising:
   an axle;
   a rack and pinion steering assembly;
   a pivot mount assembly for connecting the rack and pinion steering assembly to the axle of the vehicle such that the pivot mount assembly controls a pivoting motion of the axle relative to the rack and pinion steering assembly; and
   a leaf spring that is connected to the pivot mount assembly to support a vehicle frame.

10. The commercial vehicle suspension assembly defined in claim 1 wherein the vehicle suspension assembly utilizes a center take off design.

11. The commercial vehicle suspension assembly defined in claim 1 wherein the pivot mount assembly acts to stabilize a rack of the rack and pinion steering assembly relative to the axle thereby allowing the axle to deflect and maintain the rack in a substantially horizontal position.

12. A commercial vehicle suspension assembly comprising:

an axle;

a rack and pinion steering assembly; and a pivot mount assembly for connecting the rack and pinion steering assembly to the axle of the vehicle such that the pivot mount assembly controls a pivoting motion of the axle relative to the rack and pinion steering assembly;

wherein the pivot mount assembly comprises a clamp portion, a mounting portion and a fastener that connects the clamp portion to the mounting; and wherein the clamp portion comprises a tube portion and a pair of arms extending therefrom.

13. The commercial vehicle suspension assembly defined in claim 12 wherein the clamp portion is configured to support a rack of the rack and pinion steering assembly and the mounting portion is configured to attach the rack and pinion steering assembly to the axle.

14. The commercial vehicle suspension assembly defined in claim 12 wherein the pivot mount assembly connects the rack and pinion steering assembly to the axle using a spike mount design.

15. The commercial vehicle suspension assembly defined in claim 12 further comprising a spacer positioned between the arms for supporting the arms from being compressed together.

16. The commercial vehicle suspension assembly defined in claim 12 further comprising a first bushing positioned between the clamp portion and the mounting portion.

17. The commercial vehicle suspension assembly defined in claim 16 further comprising a second bushing positioned opposite the first bushing and between the clamp portion and a fastener.

\* \* \* \* \*